US008575972B2

(12) United States Patent
Reeves et al.

(10) Patent No.: US 8,575,972 B2
(45) Date of Patent: Nov. 5, 2013

(54) DIGITAL FREQUENCY SYNTHESIZER DEVICE AND METHOD THEREOF

(75) Inventors: Richard W. Reeves, Westborough, MA (US); Spencer M. Gold, Pepperell, MA (US); Steven J. Kommrusch, Fort Collins, CO (US); Anwar P. Kashem, Cambridge, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 123 days.

(21) Appl. No.: 12/409,228

(22) Filed: Mar. 23, 2009

(65) Prior Publication Data
US 2010/0237924 A1    Sep. 23, 2010

(51) Int. Cl.
*H03B 21/00* (2006.01)
*H03K 3/00* (2006.01)

(52) U.S. Cl.
USPC ............ 327/105; 327/107; 327/291; 327/298

(58) Field of Classification Search
USPC ......... 327/105, 107, 172, 235, 238, 254, 291, 327/298, 99; 708/271; 375/371, 373, 375, 375/376
See application file for complete search history.

(56) References Cited

U.S. PATENT DOCUMENTS

| | | | |
|---|---|---|---|
| 4,031,476 A | 6/1977 | Goldberg | |
| 4,264,863 A | 4/1981 | Kojima | |
| 4,344,036 A | 8/1982 | Dakroub et al. | |
| 4,580,282 A | 4/1986 | Lawton et al. | |
| 4,590,602 A | 5/1986 | Wolaver | |
| 4,600,895 A | 7/1986 | Landsman | |
| 4,758,945 A | 7/1988 | Remedi | |
| 5,151,986 A | 9/1992 | Langan et al. | |
| 5,189,647 A | 2/1993 | Suzuki et al. | |
| 5,233,316 A | 8/1993 | Yamada et al. | |
| 5,268,656 A | 12/1993 | Muscavage | |
| 5,291,070 A | 3/1994 | Witt | |
| 5,526,360 A * | 6/1996 | Kraft | 370/535 |
| 5,586,308 A | 12/1996 | Hawkins et al. | |
| 5,652,536 A * | 7/1997 | Nookala et al. | 327/298 |
| 5,710,929 A | 1/1998 | Fung | |
| 5,828,869 A | 10/1998 | Johnson et al. | |
| 6,021,500 A | 2/2000 | Wang et al. | |
| 6,157,265 A | 12/2000 | Hanjani | |
| 6,281,721 B1 | 8/2001 | Kinget et al. | |
| 6,281,759 B1 | 8/2001 | Coffey | |

(Continued)

OTHER PUBLICATIONS

U.S. Appl. No. 11/750,290, Office Action mailed Mar. 25, 2010 16 pages.

(Continued)

*Primary Examiner* — Lincoln Donovan
*Assistant Examiner* — Colleen O Toole

(57) ABSTRACT

A first plurality of clock signals including a first clock signal and a second clock signal is received, the first and second clock signal out of phase with each other. A second plurality of clock signals comprising a third clock signal and a fourth clock signal is received, the third and fourth clock signals out of phase with each other. A plurality of enable signals are received. A fifth clock signal is determined based on the first plurality of clock signals and the plurality of enable signals. A sixth clock signal is determined based on the second plurality of clock signals and the plurality of enable signals. A seventh clock signal is determined based on the fifth clock signal and the sixth clock signal.

19 Claims, 5 Drawing Sheets

(56) References Cited

U.S. PATENT DOCUMENTS

| | | | |
|---|---|---|---|
| 6,316,982 | B1 | 11/2001 | Gutierrez, Jr. |
| 6,359,486 | B1 * | 3/2002 | Chen .................... 327/231 |
| 6,385,126 | B2 | 5/2002 | Jung et al. |
| 6,411,135 | B2 | 6/2002 | Komoto |
| 6,584,571 | B1 | 6/2003 | Fung |
| 6,600,355 | B1 * | 7/2003 | Nguyen ................ 327/298 |
| 6,694,389 | B2 | 2/2004 | Coates et al. |
| 6,715,094 | B2 | 3/2004 | Jacobs |
| 6,983,354 | B2 | 1/2006 | Jeddeloh |
| 7,319,345 | B2 | 1/2008 | Farjad-rad et al. |
| 7,366,803 | B1 | 4/2008 | Gaither et al. |
| 7,414,443 | B2 * | 8/2008 | Jacobsson et al. ........... 327/116 |
| 7,456,674 | B2 | 11/2008 | Oakland |
| 7,460,565 | B2 * | 12/2008 | Dally et al. ................. 370/544 |
| 7,508,273 | B2 * | 3/2009 | Redman-White ............... 331/16 |
| 7,636,803 | B2 | 12/2009 | Williams et al. |
| 7,675,338 | B2 * | 3/2010 | Boerstler et al. ............. 327/175 |
| 7,681,099 | B2 | 3/2010 | Gorti et al. |
| 7,737,752 | B2 | 6/2010 | Eaton et al. |
| 2002/0140486 | A1 | 10/2002 | Boerstler et al. |
| 2002/0154723 | A1 | 10/2002 | Nakamura |
| 2004/0008725 | A1 | 1/2004 | McNamara et al. |
| 2004/0017243 | A1 | 1/2004 | Sasaki |
| 2004/0119521 | A1 | 6/2004 | Kurd et al. |
| 2005/0195009 | A1 * | 9/2005 | Mack et al. .................. 327/235 |
| 2006/0120498 | A1 | 6/2006 | Wong et al. |
| 2007/0147566 | A1 | 6/2007 | Laturell et al. |
| 2008/0094117 | A1 | 4/2008 | Stoler et al. |
| 2008/0284476 | A1 | 11/2008 | Kwan et al. |
| 2008/0285696 | A1 | 11/2008 | Kwan et al. |
| 2009/0063888 | A1 * | 3/2009 | Gold et al. .................... 713/501 |
| 2010/0049887 | A1 | 2/2010 | Williams et al. |

OTHER PUBLICATIONS

U.S. Appl. No. 11/750,284, Final Office Action mailed Jun. 1, 2010 14 pages.
Actions on the Merits by the U.S.P.T.O. as of Jun. 24, 2009, 2 pages.
U.S. Appl. No. 11/750,275, Notice of Allowance mailed Nov. 17, 2009, 4 pages.
U.S. Appl. No. 11/750,284, Non-Final Office Action mailed Jan. 15, 2010, 28 pages.
U.S. Appl. No. 11/750,267, Notice of Allowance mailed Feb. 1, 2010, 7 pages.
TDB-ACC-No. NA9002345, title "Dynamic clock frequency changing for a memory controller" dated Feb. 1, 1990.
U.S. Appl. No. 11/528,947, Notice of Allowance mailed Aug. 6, 2009, 8 pgs.
U.S. Appl. No. 11/750,267, Office Action mailed Jul. 1, 2009, 5 pgs.
U.S. Appl. No. 11/750,267, Final Office Action mailed Oct. 23, 2009, 5 pgs.
Notice of Allowance mailed Aug. 12, 2010 for U.S. Appl. No. 11/750,284, 7 pages.
Notice of Allowance mailed Nov. 24, 2010 for U.S. Appl. No. 11/750,284, 7 pages.
Non-Final Office Action mailed Sep. 16, 2010 for U.S. Appl. No. 11/750,290, 17 pages.
Notice of Allowance mailed Jan. 10, 2011 for U.S. Appl. No. 11/750,290, 7 pages.
Notice of Allowance mailed Apr. 22, 2011 for U.S. Appl. No. 11/750,290, 7 pages.
Non-Final Office Action mailed Mar. 7, 2011 for U.S. Appl. No. 12/613,837, 27 pages.
Final Office Action mailed Aug. 19, 2011 for U.S. Appl. No. 12/613,837, 11 pages.
Actions on the Merits by the U.S.P.T.O. as of Apr. 23, 2009, 1 page.
Chakraborty et al., "Efficient Self-Timed Interfaces for Crossing Clock Domains," Proceedings of the 9th International Symposium on Asynchronous Circuits and Systems, IEEE 2003, pp. 1-11.
Chelcea et al., "A Low-Latency FIFO for Mixed-Clock Systems," Department of Computer Science, Columbia University, 8 pages.
Chelcea et al., "Robust Interfaces for Mixed-Timing Systems," IEEE Transactions on Very Large Scale Integration (VLSI) Systems, vol. 12, No. 8, Aug. 2004, p. 857-873.
Messerschmitt, David G., "Synchronization in Digital System Design," IEEE Journal on Selected Areas in Communications, vol. 8, No. 8, Oct. 1990, pp. 1404-1419.
Seizovic, Jakov N., "Pipeline Synchronization," Myricom, Inc., 0-8186-6210-7/94, IEEE 1994, pp. 87-96.
PCT International Search Report for PCT/2008/006342, 3 pages.

* cited by examiner

DIGITAL FREQUENCY SYNTHESIZER DEVICE AND METHOD THEREOF

CROSS-REFERENCE TO RELATED APPLICATIONS

The present application is related to co-pending U.S. patent application Ser. No. 11/750,267, entitled "TECHNIQUES FOR INTEGRATED CIRCUIT CLOCK MANAGEMENT" filed on May 17, 2007, U.S. patent application Ser. No. 11/750,284, entitled "TECHNIQUES FOR INTEGRATED CIRCUIT CLOCK MANAGEMENT USING PULSE SKIPPING" filed on May 17, 2007, U.S. patent application Ser. No. 11/750,290, entitled "TECHNIQUES FOR INTEGRATED CIRCUIT CLOCK MANAGEMENT USING MULTIPLE CLOCK GENERATORS" filed on May 17, 2007, and U.S. patent application Ser. No. 11/750,275, entitled "TECHNIQUES FOR INTEGRATED CIRCUIT CLOCK SIGNAL MANIPULATION TO FACILITATE FUNCTIONAL AND SPEED TEST" filed on May 17, 2007, the entirety of which is incorporated by reference herein.

BACKGROUND

1. Field of the Disclosure

The present disclosure is generally directed to clock management and, and more particularly to clock management at an integrated circuit.

2. Description of the Related Art

A data processing device, such as an integrated circuit microprocessor device, can include a large number of data subsystems fabricated at a single semiconductor die. For example, a microprocessor device can include a memory interface subsystem and a graphics acceleration subsystem in addition to a central processing unit. Each data subsystem can operate as a data processor and can include disparate operating frequency limitations. Therefore, the computational performance of the microprocessor device is typically improved if each data subsystem is configured to operate at a respective frequency that can be different from that of another data subsystem. Furthermore, it can be advantageous if the operating frequency of a particular data subsystem can be changed efficiently while the data subsystem continues to operate. For example, the microprocessor can transition a data subsystem between a typical power operating mode and a low-power operating mode by altering the frequency of a clock signal provided to that data subsystem.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A digital frequency synthesizer (DFS) is disclosed that is operable to provide an output clock signal, wherein the frequency of the output clock signal is a fractional multiple of the frequency of an input reference clock signal. The fractional multiple (divisor) can be adjusted, and the DFS can be configured to provide an output clock waveform with a substantially balanced duty cycle. By replicating portions of the DFS, multiple clock signals can be provided wherein the frequency of each clock signal can be individually determined and wherein each clock signal has a known phase relationship. The known phase relationship between the generated clocks allows for low-latency and deterministic exchange of data information between data subsystems operating at different clock frequencies.

Figure 1:
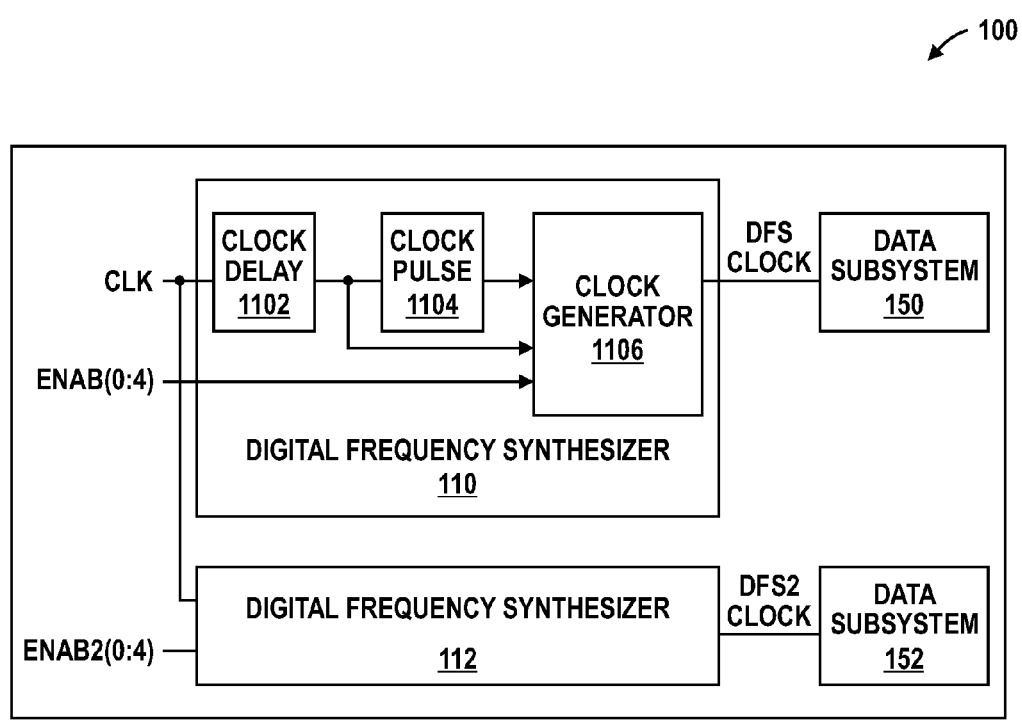
FIG. 1 illustrates in block diagram form a data processing device including a digital frequency synthesizer in accordance with a specific embodiment of the present disclosure.

FIG. 1 illustrates in block diagram form a data processing device 100 including a DFS in accordance with a specific embodiment of the present disclosure. Data processing device 100 includes a DFS 110, a DFS 112, a data subsystem 150, and a data subsystem 152. DFS 110 includes a clock delay module 1102, a clock pulse module 1104, and a clock generator module 1106. Clock delay module 1102 has an input to receive a clock signal labeled "CLK," and an output. Clock pulse module 1102 has an input connected to the output of clock delay module 1102, and an output. Clock generator module 1106 has an input connected to the output of clock pulse module 1104, an input connected to the output of clock delay module 1102, an input to receive a signal labeled "ENAB(0:4)," and an output to provide a clock signal labeled "DFS CLOCK." DFS 112 is operable to provide a second clock signal labeled "DFS2 CLOCK." A clock generator (not shown) included at DFS 112 is configured by a second enable signal labeled "ENAB2(0:4)."

Clock delay module 1102 is configured to provide multiple delayed clock signals. For example, eight delayed clock signals can be provided, wherein each of the eight delayed clock signals represents the clock signal CLK delayed by a particular phase angle. The eight phase delays provided by clock delay module 1102 include 0°, 45°, 90°, 135°, 180°, 225°, 270°, and 315°, respectively. Clock delay module 110 can include a delay-locked-loop (DLL), not shown, that includes eight substantially equivalent delay elements connected in series and provided to a phase detector along with clock signal CLK. Thus, while the DLL is in a condition of lock with respect to clock signal CLK, the output of each respective delay element provides a corresponding one of the eight delayed clock signals. Therefore, each of the eight delayed clock signals provided by clock delay module 110 maintain their phase relationship relative to each other, even as the frequency of clock signal CLK is changed. In another embodiment, the delay locked loop included at clock delay module 110 is integral with a primary voltage-controlled phase locked loop (PLL) that provides clock signal CLK.

Clock pulse module 1104 is configured to receive the eight delayed clock signals from clock delay module 1102 and provide eight corresponding clock pulse signals. Each clock pulse signal transitions to a logic-high level substantially coincident with the logic-high transition of its corresponding delayed clock signal, and transitions back to a logic-low level before the logic-low transition of the corresponding delayed clock signal. The logic-high level of each clock pulse signal is maintained for a duration corresponding to 90° (Π/2 radians). Each clock pulse can be the result of a logical AND of two delayed clock signals. For example, the logical AND of the 0° delayed clock and the 270° delayed clock provides a clock pulse that transitions to a logic-high level at 0° and returns to a logic-low level at 90°. In another embodiment, clock delay module 1102 can provide a greater or a fewer number of delayed clock signals to clock pulse module 1104. For example, clock delay module 1102 can include ten delay elements and thus provide ten delayed clock signals to clock pulse module 1104, corresponding to phase delays of 0°, 36°, 72°, 108°, 144°, 180°, 216°, 252°, 288°, and 324°. Clock pulse module 1104 would thus provide ten corresponding clock pulse signals to clock generator module 1106, wherein the duration of each pulse is 72°. The operation of clock delay module 1102 and clock pulse module 1104 is further described with reference to the timing diagram at FIG. 2.

Clock generator module 1106 is configured to selectively combine the clock pulses provided by clock pulse module 1106 to generate clock signal DFS CLOCK at the output of the DFS module 110 in response to enable signals ENAB(0:4). The frequency of signal DFS CLOCK can be adjusted to represent input clock signal CLK divided by a factor of between one and 7.75 by configuring signal ENAB(0:3) appropriately. In particular, the frequency of clock signal DFS CLOCK=the frequency of input clock signal CLK divided by N/4, where N is an integer that can range from 4 to 63. Thus, the frequency of clock signal DFS CLOCK can be configured to be equal to the frequency of input clock CLK divided by one of 1, 1.25, 1.5, 1.75, 2.0, 2.25, 2.5, 2.75, 3.0, 3.25, 3.5, 3.75 . . . 7.75. Furthermore, the duty cycle of clock signal DFS CLOCK can be configured to be substantially fifty percent for each clock divisor.

Signal ENAB(0:3) is configured to provide a sequence of four-bit data values that determines the frequency of clock signal DFS CLOCK. The data value provided by signal ENAB(0:3) is maintained for one cycle of clock signal CLK, and then a new data value can be provided. Signal ENAB(4) is asserted to configure the duty cycle of clock signal DFS CLOCK to substantially fifty percent when the desired clock divisor is not evenly divisible by decimal 0.5. For example, signal ENAB(4) is asserted when a divisor of 1.25, 1.75, 2.25 . . . 7.75 is desired, and negated when a divisor of 1.0, 1.5, 2.0 . . . 7.5 is desired.

Data subsystem 150 and data subsystem 152 each include one or more data processing modules (not shown). Each data processing module included at data subsystem 150 is included within a common clock domain, and each data processing module included at data subsystem 152 shares another clock domain. A clock domain is a particular clock frequency shared by a group of data processing modules. Data processing device 100 can include multiple data subsystems and each respective data subsystem can be associated with a corresponding clock domain. DFS 110, or a portion of DFS 110 can be replicated to provide a desired clock signal for each clock domain. Each DFS can be individually configured to provide a preferred output clock frequency using a corresponding sequence of enable values. In one embodiment, two clock generators can share clock delay module 1102 and clock pulse module 1104 to provide two output clock signals to two data subsystems. For example, DFS 112 can include the same modules as DFS 110, or it may share the clock delay module, the clock pulse module, or both, with DFS 110. Each additional DFS, such as DFS 112, includes a clock generator module (not shown).

Figure 2:
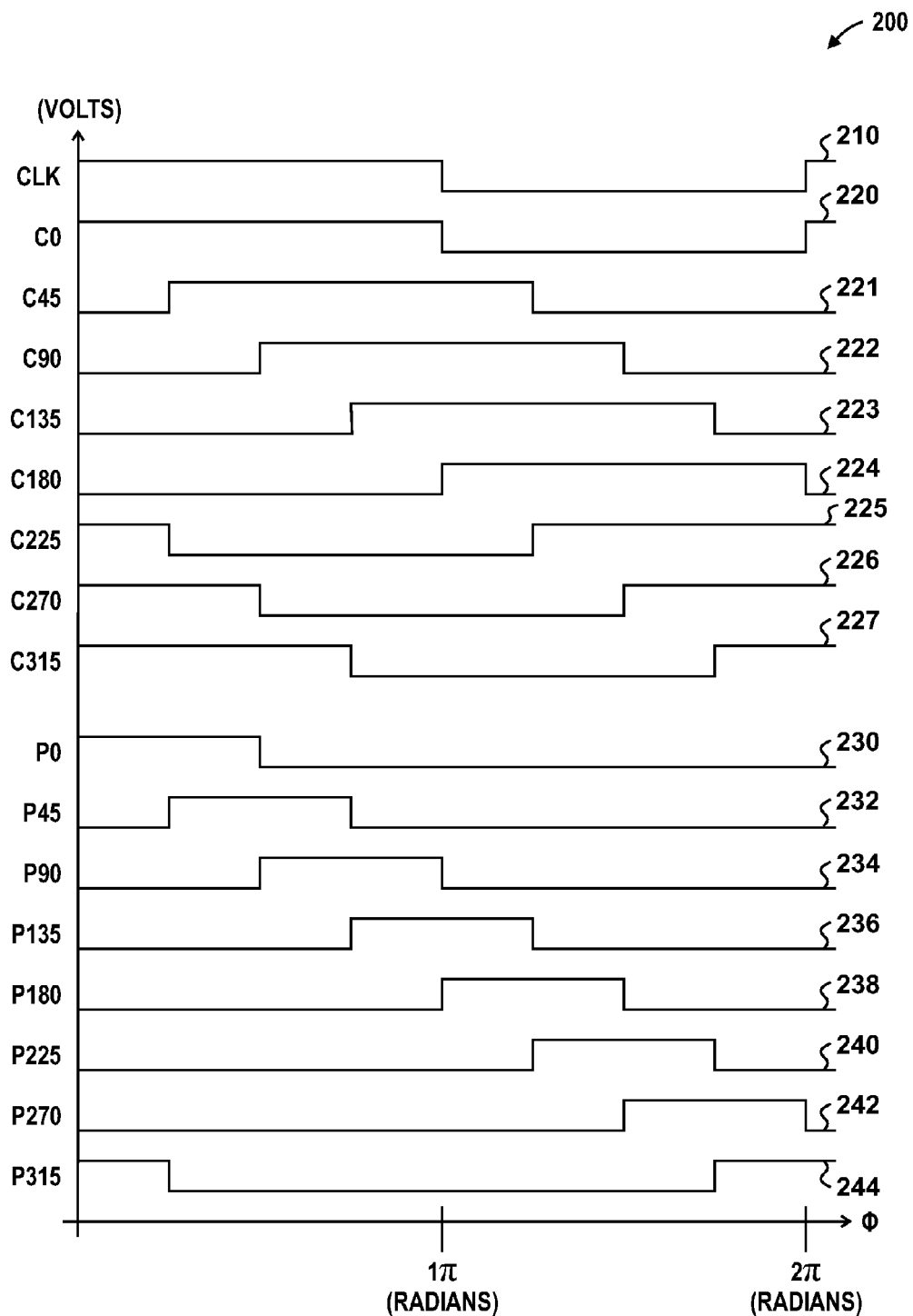
FIG. 2 is a timing diagram illustrating the operation of a clock delay module and clock pulse module of FIG. 1 in accordance with a specific embodiment of the present disclosure.

FIG. 2 is a timing diagram 200 illustrating the operation of a clock delay module 1102 and clock pulse module 1104 of FIG. 1 in accordance with a specific embodiment of the present disclosure. Timing diagram 200 includes a horizontal axis representing time and a vertical axis representing voltage in units of volts. Timing diagram 200 includes a waveform 210 representing input clock signal CLK, waveforms 220, 221, 222, 223, 224, 225, 226, and 227 representing delayed clock signals labeled "C0," "C45," "C90," "C135," "C180," "C225," "C270," and "C315," respectively. Timing diagram 200 also includes waveforms 230, 232, 234, 236, 238, 240, 242, and 244 representing clock pulses labeled "P0," "P45," "P90," "P135," "P80," "P225," "P270," and "P315," respectively.

Each of delayed clock signals C0-C315 represent input clock signal CLK delayed by 0°, 45°, 90°, 135°, 180°, 225°, 270°, and 315°, respectively. Each of clock pulses P0-P315 represents the logical AND of a pair of delayed clock signals C0-C315. For example, clock pulse P0 is the logical AND of delayed clock signals C270 and C0. Clock pulse P90 is the logical AND of delayed clock signals C0 and C90. Clock pulse P180 is the logical AND of delayed clock signals C0 and C90. Clock pulse P180 is the logical AND of delayed clock signals C90 and C180. Clock pulse P270 is the logical AND of delayed clock signals C180 and C270. Clock pulse P45 is the logical AND of delayed clock signals C315 and C45. Clock pulse P135 is the logical AND of delayed clock signals C45 and C135. Clock pulse P225 is the logical AND of delayed clock signals C135 and C225. Clock pulse P315 is the logical AND of delayed clock signals C225 and C315.

Delayed clocks C0-C315 and pulse clocks P0-315 maintain their respective relationship to input clock signal CLK independent of how clock generator 1106 is configured and independent of the frequency of clock signal DFS CLOCK. Due to delays inherent at clock delay module 1102 and clock pulse module 1104, individual delayed clocks and clock phases may be skewed relative to clock signal CLK.

Figure 3:
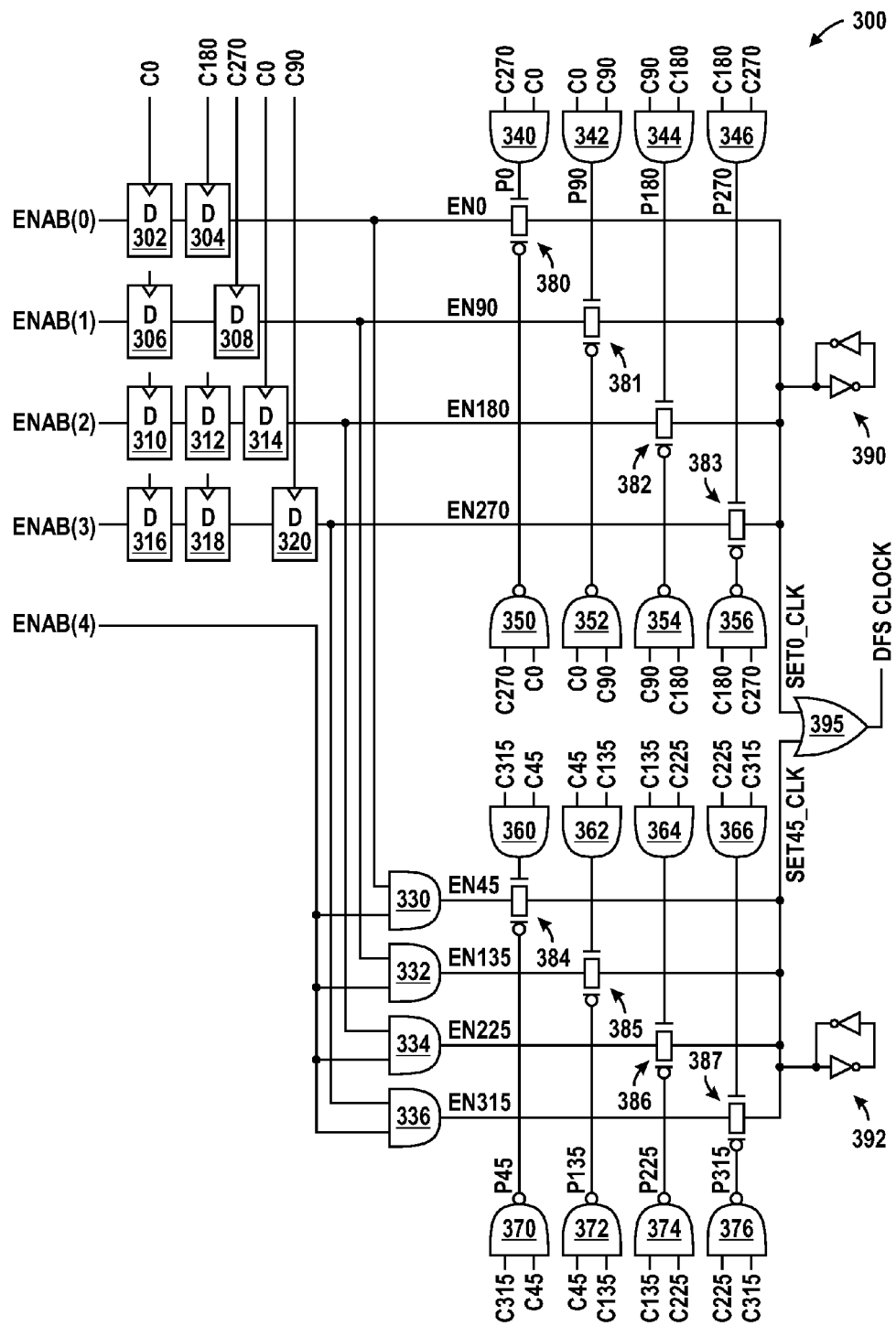
FIG. 3 illustrates in schematic form a portion of the DFS of FIG. 1 including the clock pulse module and clock generator module in accordance with a specific embodiment of the present disclosure.

FIG. 3 illustrates in schematic form a portion 300 of DFS 110 of FIG. 1 including clock pulse module 1104 and clock generator module 1106 in accordance with a specific embodiment of the present disclosure. Portion 300 includes latches 302, 304, 306, 308, 310, 312, 314, 316, 318, and 320, AND gates 330, 332, 334, 336, 340, 342, 344, 346, 360, 362, 364, and 366, NAND gates 350, 352, 354, 356, 370, 372, 374, and 376, transmission gates 380, 381, 382, 383, 384, 385, 386, and 387, level retention latches 390 and 392, and an OR gate 395.

Latch 302 has a clock input to receive delayed clock signal C0, an input to receive signal ENAB(0), and an output. Latch 304 has a clock input to receive delayed clock signal C180, an input connected to the output of latch 302, and an output connected to a node labeled "EN0." Latch 306 has a clock input to receive delayed clock signal C0, an input to receive signal ENAB(1), and an output. Latch 308 has a clock input to receive delayed clock signal C270, an input connected to the output of latch 306, and an output connected to a node labeled "EN90." Latch 310 has a clock input to receive delayed clock signal C0, an input to receive signal ENAB(2), and an output. Latch 312 has a clock input to receive delayed clock signal C180, an input connected to the output of latch 310, and an output. Latch 314 has an clock input to receive delayed clock signal C0, an input connected to the output of latch 312, and an output connected to a node labeled "EN180." Latch 316 has a clock input to receive delayed clock signal C0, an input to receive signal ENAB(3), and an output. Latch 318 has a clock input to receive delayed clock signal C180, an input connected to the output of latch 316, and an output. Latch 320 has an clock input to receive delayed clock signal C90, an input connected to the output of latch 318, and an output connected to a node labeled "EN270."

AND gate 330 has an input to receive signal ENAB(4), an input connected to node EN0, and an output to provide a signal labeled "EN45." AND gate 332 has an input to receive signal ENAB(4), an input connected to node EN90, and an output to provide a signal labeled "EN135." AND gate 334 has an input to receive signal ENAB(4), an input connected to node EN180, and an output to provide a signal labeled "EN225." AND gate 336 has an input to receive signal ENAB(4), an input connected to node EN270, and an output to provide a signal labeled "EN315."

AND gate 340 has an input to receive delayed clock signal C270, an input to receive delayed clock signal C0, and an output. AND gate 342 has an input to receive delayed clock signal C0, an input to receive delayed clock signal C90, and an output. AND gate 344 has an input to receive delayed clock signal C90, an input to receive delayed clock signal C180, and an output. AND gate 346 has an input to receive delayed clock signal C180, an input to receive delayed clock signal C270, and an output.

NAND gate 350 has an input to receive delayed clock signal C270, an input to receive delayed clock signal C0, and an output. NAND gate 352 has an input to receive delayed clock signal C0, an input to receive delayed clock signal C90, and an output. NAND gate 354 has an input to receive delayed clock signal C90, an input to receive delayed clock signal C180, and an output. NAND gate 356 has an input to receive delayed clock signal C180, an input to receive delayed clock signal C270, and an output.

AND gate 360 has an input to receive delayed clock signal C315, an input to receive delayed clock signal C45, and an output. AND gate 362 has an input to receive delayed clock signal C45, an input to receive delayed clock signal C135, and an output. AND gate 364 has an input to receive delayed clock signal C135, an input to receive delayed clock signal C225, and an output. AND gate 366 has an input to receive delayed clock signal C225, an input to receive delayed clock signal C315, and an output.

NAND gate 370 has an input to receive delayed clock signal C315, an input to receive delayed clock signal C45, and an output. NAND gate 372 has an input to receive delayed clock signal C45, an input to receive delayed clock signal C135, and an output. NAND gate 374 has an input to receive delayed clock signal C135, an input to receive delayed clock signal C225, and an output. NAND gate 376 has an input to receive delayed clock signal C225, an input to receive delayed clock signal C315, and an output.

Transmission gate 380 has an input connected to node EN0, an n-channel input connected to the output of AND gate 340, a p-channel input connected to the output of NAND gate 350, and an output connected to a node labeled "SET0_CLK. Transmission gate 381 has an input connected to node EN90, an n-channel input connected to the output of AND gate 342, a p-channel input connected to the output of NAND gate 352, and an output connected to a node labeled "SET0_CLK. Transmission gate 382 has an input connected to node EN180, an n-channel input connected to the output of AND gate 344, a p-channel input connected to the output of NAND gate 354, and an output connected to a node labeled "SET0_CLK. Transmission gate 383 has an input connected to node EN270, an n-channel input connected to the output of AND gate 346, a p-channel input connected to the output of NAND gate 356, and an output connected to a node labeled "SET0_CLK.

Transmission gate 384 has an input connected to node EN45, an n-channel input connected to the output of AND gate 360, a p-channel input connected to the output of NAND gate 370, and an output connected to a node labeled "SET45_CLK. Transmission gate 385 has an input connected to node EN135, an n-channel input connected to the output of AND gate 362, a p-channel input connected to the output of NAND gate 372, and an output connected to a node labeled "SET45_CLK. Transmission gate 386 has an input connected to node EN225, an n-channel input connected to the output of AND gate 364, a p-channel input connected to the output of NAND gate 374, and an output connected to a node labeled "SET45_CLK. Transmission gate 387 has an input connected to node EN315, an n-channel input connected to the output of AND gate 366, a p-channel input connected to the output of NAND gate 376, and an output connected to a node labeled "SET45_CLK.

Level retention latch 390 has an input/output terminal connected to node SET0_CLK. Level retention latch 392 has an input/output terminal connected to node SET45_CLK. OR gate 395 has an input connected to node SET0_CLK, an input connected to node SET45_CLK, and an output to provide signal DFS CLOCK.

Latches 302 and 304 are configured to delay signal ENAB(0) by 180°. Latches 306 and 308 are configured to delay signal ENAB(1) by 270°. Latches 310, 312, and 314 are configured to delay signal ENAB(2) by 360°. Latches 316, 318, and 320 are configured to delay signal ENAB(3) by 450°.

AND gates 340, 342, 344, and 346 are configured to provide signals P0, P90. P180, and P270, respectively. NAND gates 350, 352, 354, and 356 are configured to provide the inverse of signals P0, P90. P180, and P270, respectively. AND gates 360, 362, 364, and 366 are configured to provide signals P45, P135. P225, and P315, respectively. NAND gates 3770, 372, 374, and 376 are configured to provide the inverse of signals P45, P135. P225, and P315, respectively.

Transmission gates 380-383 are configured to select one of clock pulse signals P0, P90, P180, and P270 and provide that clock pulse signal to node SET0_CLK in response to the logic level of signals provided at nodes EN0, EN90, EN180, EN270, respectively. The Transmission gates 384-387 are configured to select one of clock pulse signals P45, P135, P225, and P315 and provide that clock pulse signal to node SET45_CLK in response to the logic level of signals provided at nodes EN45, EN135, EN225, and EN315, respectively. During any time that node SET0_CLK is not actively driven, level retention latch 390 maintains the previously driven value at node SET0_CLK. During any time that node SET45_CLK is not actively driven, level retention latch 392 maintains the previously driven value at node SET45_CLK.

OR gate 395 is configured to combine signals conducted at nodes SET0_CLK and SET45_CLK to provide clock signal DFS CLOCK, which represents the superposition of the individual clock signals at node SET0_CLK and node SET45_CLK. Clock generator 130 can provide clock signal DFS CLOCK, where clock signal DFS CLOCK is a desired clock frequency relative to the frequency of input clock signal CLK as previously described. Clock signal DFS CLOCK is a superposition of particular individual clock pulses. The selection of particular clock pulses is determined by a sequence of values encoded by signal ENAB(0:3) and signal ENAB(4). In a particular embodiment, the sequence of values provided by signal ENAB(0:3) can include up to sixteen four-bit values derived from a sequence of up to sixty-four binary values. A longer or shorter sequence of binary values can be used to provide a greater or fewer number of frequency divisor options. Clock signal SET45_CLK remains at a logic-low level if signal ENAB(4) is negated. Signal ENAB(4) is asserted when a desired clock divisor is not evenly divisible by decimal 0.5 so that the generated clock signal DFS CLOCK exhibits a substantially fifty percent duty cycle.

Figure 4:
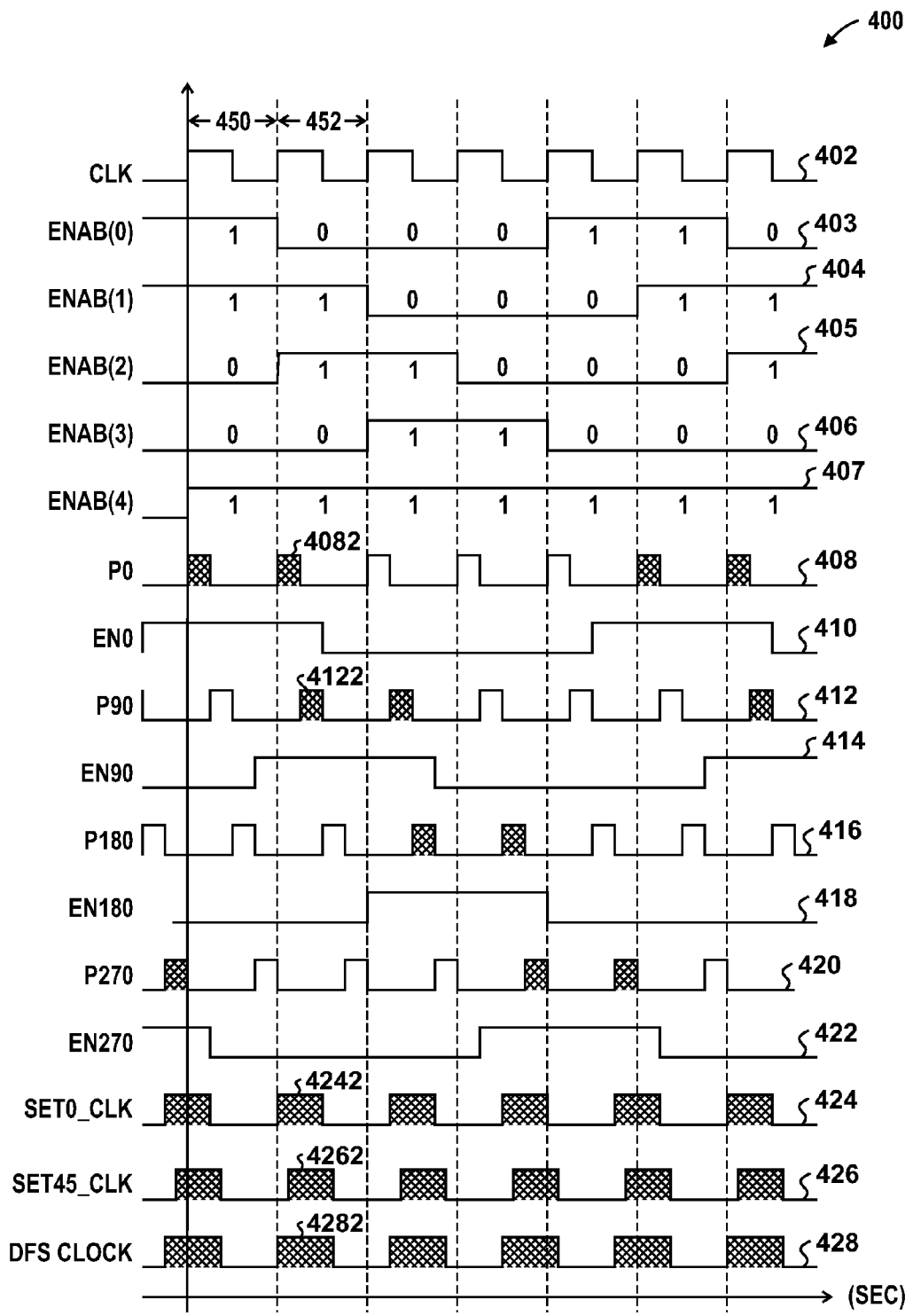
FIG. 4 is a timing diagram illustrating the operation of the clock pulse module and a clock generator module of FIG. 1 in accordance with a specific embodiment of the present disclosure.

FIG. 4 is a timing diagram 400 illustrating the operation of the clock pulse module and a clock generator module of FIG. 1 in accordance with a specific embodiment of the present disclosure. Timing diagram illustrates the operation of DFS 110 as configured to provide a clock signal DFS CLOCK, wherein the frequency of clock signal DFS CLOCK is substantially equal to the frequency of signal CLK divided by a value of 5/4. Timing diagram 400 includes a horizontal axis representing time, and a vertical axis representing voltage in volts.

Timing diagram 400 includes signal waveforms 402, 403, 404, 405, 406, 407, 408, 410, 412, 414, 416, 418, 420, 422, 424, 426, and 428. Waveform 402 represents clock signal CLK of FIG. 1 and FIG. 2. Waveform 408, 412, 416, and 420 represent signals P0, P90, P180, and P270 of FIG. 3, respectively. Waveforms 410, 414, 418, and 422 represent signals EN0, EN90, EN180, and EN270 of FIG. 3, respectively. Waveform 424, 426, and 428 represent signals at nodes SET0_CLK and SET45_CLK, and signal DFS CLOCK of FIG. 3, respectively. Waveforms 403, 404, 405, 406, and 407 represents the values associated with signal ENAB(0:4) during each cycle of clock signal CLK. A first cycle of clock signal CLK is associated with reference 450, and the second cycle of clock signal CLK is associated with reference 452. Timing diagram 400 also includes exemplary signal pulses 4082, 4122, 4242, 4262, and 4282.

DFS 110 is configured to select appropriate portions of signals provided by clock delay module 1102, clock pulse module 1104, and clock generator module 1106, and superimpose the selected signal waveforms to represent a desired clock signal DFS CLOCK at the output of clock generator 1106. Particular signals are selected based upon the value encoded by signal ENAB(0:4) during successive cycles of clock signal CLK. The data value provided by signal ENAB(0:3) at a particular cycle of clock signal CLK is based on a repeating sequence of binary values, whereby the repeating sequence of binary values determines the clock divisor implemented by clock generator 1106. The clock divisor illustrated at FIG. 4 is 5/4. Therefore, the frequency of clock signal DFS_CLOCK will be equal to the frequency of clock signal CLK divided by 1.25. The repeating sequence of binary value associated with a clock divisor of 5/4 is 1, 1, 0, 0, 0. The binary sequence is partitioned into groups of four binary values where each respective group is associated with a corresponding clock cycle. Signal ENAB(0:3) is encoded to these four binary values for the duration of each clock cycle. For example, during cycle 450, signal ENAB(0) is set to a value of 1, signal ENAB(1) is set to a value of 1, signal ENAB(2) is set to a value of 0, and signal ENAB(3) is set to a value of 0, and these values are maintained for the duration of cycle 450. The final zero of the five-bit binary sequence is provided during cycle 452 via signal ENAB(0), while signals ENAB(1:3) represent the sequence beginning anew. Thus, the repeating five-bit binary sequence 110001100011000 . . . is partitioned into four-bit groups 1100 0110 0011 0001, etc. Each group is provided by signal ENAB(0:3) during each successive cycle of clock signal CLK.

During clock cycle 450, signal ENAB(0) has a value of 1. Thus, signal EN0 410 is generated. Signal EN0 410 is logically ANDed with signal P0 and the resulting pulse 4802 is provided to node SET0_CLK during cycle 452. During clock cycle 450, signal ENAB(1) is also asserted. Thus, signal EN90 414 is generated. Signal EN90 414 is logically ANDed with signal P90, and the resulting pulse 4122 is provided to node SET0_CLK during cycle 452. The superposition of pulses 4802 and 4122 are illustrated by pulse 4242 of signal 424 at node SET0_CLK.

When the desired clock divisor is not divisible by 0.5, signal ENAB(4) will remain asserted, as illustrated by binary sequence 407. If the desired clock divisor is divisible by 0.5, signal ENAB(4) will remain negated. The assertion of signal ENAB(4), enables the operation of the portion of clock generator 1106 associated with node SET45_CLK. Pulses accumulated at node SET45_CLK are substantially the same as pulses provided to node SET0_CLK with the distinction that each respective pulse provided to node SET45_CLK is delayed by 45° relative to a corresponding pulse provided to node SET0_CLK. For example, pulse 4262 at node SET45_CLK is substantially equal to pulse 4242 at node SET0_CLK, but delayed by 45°. In another embodiment, clock generator 1106 can be configured to manipulate a greater or a fewer number of clock pulses. For example, clock pulse module 1104 can provide ten unique clock pulses to clock generator module 1106, and each respective pulse provided to node SET45_CLK would be delayed by 36° relative to a corresponding pulse provided to node SET0_CLK.

Signal DFS CLOCK is the logical AND of the signals at nodes SET0_CLK and SET45_CLK. Thus, pulse 4282 at signal DFS CLOCK 428 represents the superposition of pulse 4242 and pulse 4262. Binary sequence 404 represented by signal ENAB(0:3) determines which of pulses P0, P45, P90, P135, P180, P225, P270, and P315 are selected during particular cycles of clock signal CLK. Clock signal DFS CLOCK is provided by DFS 110 as long as the repeating binary sequence is provided to clock generator 1106.

The following table illustrates the binary sequence operable to provide the indicated clock divisor.

| DIVISOR | BINARY SEQUENCE |
|---|---|
| 4/4 | 4'b1100 |
| 5/4 | 5'b11000 |
| 6/4 | 6'b111000 |
| 7/4 | 7'b1110000 |
| 8/4 | 8'b11110000 |
| 9/4 | 9'b111100000 |
| 10/4 | 10'b1111100000 |
| 11/4 | 11'b11111000000 |
| 12/4 | 12'b111111000000 |
| 13/4 | 13'b1111110000000 |
| 14/4 | 14'b11111110000000 |
| 15/4 | 15'b111111100000000 |
| 16/4 | 16'b1111111100000000 |
| 17/4 | 17'b11111111000000000 |
| 18/4 | 18'b111111111000000000 |

-continued

| DIVISOR, | BINARY SEQUENCE |
|---|---|
| 19/4 | 19'b11111111110000000000 |
| 20/4 | 20'b111111111110000000000 |
| 21/4 | 21'b111111111100000000000 |
| 22/4 | 22'b1111111111100000000000 |
| 23/4 | 23'b11111111111000000000000 |
| 24/4 | 24'b111111111111000000000000 |
| 25/4 | 25'b1111111111110000000000000 |
| 26/4 | 26'b11111111111110000000000000 |
| 27/4 | 27'b111111111111100000000000000 |
| 28/4 | 28'b1111111111111100000000000000 |
| 29/4 | 29'b11111111111111000000000000000 |
| 30/4 | 30'b111111111111111000000000000000 |
| 31/4 | 31'b1111111111111110000000000000000 |
| 32/4 | 32'b11111111111111110000000000000000 |
| 33/4 | 33'b111111111111111100000000000000000 |
| 34/4 | 34'b1111111111111111100000000000000000 |
| 35/4 | 35'b11111111111111111100000000000000000 |
| 36/4 | 36'b111111111111111111000000000000000000 |
| 37/4 | 37'b1111111111111111110000000000000000000 |
| 38/4 | 38'b11111111111111111111000000000000000000 |
| 39/4 | 39'b111111111111111111110000000000000000000 |
| 40/4 | 40'b1111111111111111111100000000000000000000 |
| 41/4 | 41'b11111111111111111111000000000000000000000 |
| 42/4 | 42'b111111111111111111111000000000000000000000 |
| 43/4 | 43'b1111111111111111111110000000000000000000000 |
| 44/4 | 44'b11111111111111111111100000000000000000000000 |
| 45/4 | 45'b111111111111111111111000000000000000000000000 |
| 46/4 | 46'b1111111111111111111111000000000000000000000000 |
| 47/4 | 47'b11111111111111111111111000000000000000000000000 |
| 48/4 | 48'b111111111111111111111110000000000000000000000000 |
| 49/4 | 49'b1111111111111111111111100000000000000000000000000 |
| 50/4 | 50'b11111111111111111111111100000000000000000000000000 |
| 51/4 | 51'b111111111111111111111111000000000000000000000000000 |
| 52/4 | 52'b1111111111111111111111110000000000000000000000000000 |
| 53/4 | 53'b11111111111111111111111110000000000000000000000000000 |
| 54/4 | 54'b111111111111111111111111110000000000000000000000000000 |
| 55/4 | 55'b1111111111111111111111111100000000000000000000000000000 |
| 56/4 | 56'b11111111111111111111111111000000000000000000000000000000 |
| 57/4 | 57'b111111111111111111111111110000000000000000000000000000000 |
| 58/4 | 58'b1111111111111111111111111111000000000000000000000000000000 |
| 59/4 | 59'b11111111111111111111111111110000000000000000000000000000000 |
| 60/4 | 60'b111111111111111111111111111110000000000000000000000000000000 |
| 61/4 | 61'b1111111111111111111111111111110000000000000000000000000000000 |
| 62/4 | 62'b11111111111111111111111111111100000000000000000000000000000000 |
| 63/4 | 63'b111111111111111111111111111111100000000000000000000000000000000 |

The first column of the table indicates the desired divisor, and ranges from 4/4 where the frequency of clock signal DFS CLOCK is the same as input clock signal CLK, to 63/4, where the frequency of clock signal DFS CLOCK is equal to the frequency of input clock signal CLK divided by 63/4 (decimal 7.75). The second column of the table includes a decimal number indicating the number of binary bits included in the binary sequence, followed by the binary sequence. For example, a divisor of 5/4 as illustrated at timing diagram 400 at FIG. 4 is included at the second row of the table. The associated information identifies that the binary sequence is five bits in length, and the binary sequence is 1, 1, 0, 0, and 0. The binary sequence is continuously repeated for as long as clock signal DFS CLOCK is desired. The frequency of clock signal DFS CLOCK can be adjusted as desired by providing an appropriate sequence of data values at signal ENAB(0:4). Furthermore, the frequency of clock signal DFS CLOCK can be adjusted while data subsystem 150 continues to operate. Because the divisor 5/4 is not divisible by 0.5, signal ENAB (4) is asserted for the entire duration that signal DFS CLOCK is desired.

A divisor of 6/4 is achieved by using the six-bit binary sequence included at the third row of the table: 1, 1, 1, 0, 0, 0. This sequence is repeated and is portioned into groups of four bits: 1110 0011 1000 1110, etc, and each four-bit group is encoded via signal ENAB(0:3) during successive cycles of clock signal CLK. Because the divisor 6/4 is divisible by 0.5, signal ENAB(4) is negated for the entire duration that signal DFS CLOCK is desired.

Figure 5:
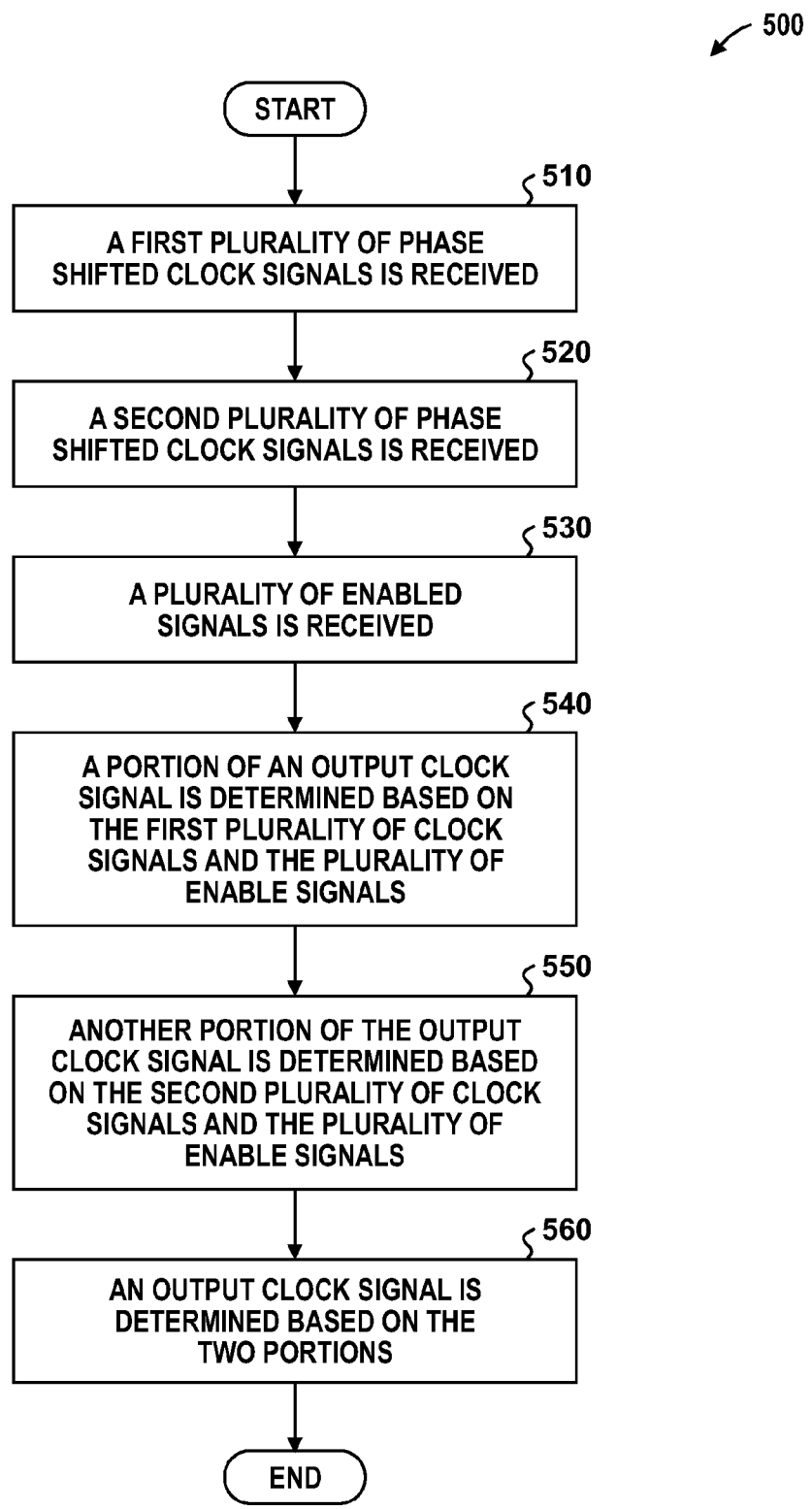
FIG. 5 is a flow diagram illustrating a method in accordance with a specific embodiment of the present disclosure.

FIG. 5 is a flow diagram 500 illustrating a method in accordance with a specific embodiment of the present disclosure. The flow begins at block 510 where a first plurality of phase shifted clock signals is received from clock delay module 1102, including signals C0, C90, C180, and C270. The flow proceeds to block 520 where a second plurality of phase shifted clock signals is received from clock delay module 1102, including signals C45, C135, C225, and C315. These signals represent input clock signal CLK successively shifted by 45°. The flow proceeds to block 530 where a sequence of data values are received at clock generator 1106 via enable signals ENAB(0:4). The flow proceeds to block 540 where a portion of output clock signal DFS CLOCK is synthesized at node SET0_CLK based on the first plurality of phase shifted clock signals and the signal ENAB(0:4). The flow proceeds to block 550 where another portion of output clock signal DFS CLOCK is synthesized at node SET45_CLK based on the second plurality of phase shifted clock signals and the signal ENAB(0:4). The flow proceeds to block 560 where output clock signal DFS CLOCK is determined by logically superimposing the signals provided at nodes SET0_CLK and SET45_CLK.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, DFS 110 can be configured to provide a clock signal other than a fifty percent duty cycle square-wave. Providing an appropriate sequence of enable data values to clock generator module 1106 can provide clock signals with another duty cycle. Furthermore, DFS CLOCK can be configured to include a pulse-train with a desired sequence of duty cycles. The transition from one clock frequency to another can be configured to include specific control of pulse-duration as needed to achieve setup and hold requirements.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
    receiving a first plurality of clock signals comprising a first clock signal and a second clock signal, the first and second clock signal out of phase with each other;
    receiving a second plurality of clock signals comprising a third clock signal and a fourth clock signal, the third and fourth clock signals out of phase with each other;
    receiving a plurality of enable signals representing a periodic sequence of changing enable codes, the periodic sequence of changing enable codes having a first value during a first cycle, a second value during a second cycle, and a third value during a third cycle;
    combining a subset of the first plurality of clock signals according to a first logical operation to determine a fifth clock signal;
    determining a sixth clock signal based on the fifth clock signal and the plurality of enable signals;
    combining a subset of the second plurality of clock signals according to a second logical operation to determine a seventh clock signal;
    determining an eighth clock signal based on the seventh clock signal and the plurality of enable signals; and
    determining a ninth clock signal based on the sixth clock signal and the eighth clock signal, the ninth clock signal having a frequency based on the changing sequence of enable codes, the sequence of enable codes changing while the ninth clock signal is being provided at the frequency, the frequency based on a length of the periodic sequence of enable codes.

2. The method of claim 1, wherein the third clock signal and the fourth clock signal are each out of phase with the first clock signal and the second clock signal.

3. The method of claim 1, wherein a frequency of the eighth clock signal is based on the plurality of enable signals.

4. The method of claim 3, wherein the first plurality of clock signals and the second plurality of clock signals are based on an input reference clock signal, and wherein the frequency of the ninth clock signal is a fractional multiple of the frequency of the input reference clock signal, the fractional multiple determined based on the sequence of enable codes.

5. The method of claim 1, wherein the ninth clock signal has a duty cycle of about fifty percent, the duty cycle based only on superimposing the fifth clock signal and the eighth clock signal.

6. The method of claim 5, wherein the eighth clock signal is operable to adjust the duty cycle of the ninth clock signal.

7. The method of claim 1, wherein a pulse width of the ninth clock signal is greater than a pulse width of the sixth clock signal.

8. The method of claim 1, wherein the first logical operation comprises an AND operation.

9. The method of claim 8, wherein the second logical operation comprises an AND operation.

10. The method of claim 1, wherein the first clock signal is about N degrees out of phase with the second clock signal, and wherein N is an integer multiple of 90.

11. The method of claim 10, wherein the third clock signal is about M degrees out of phase with the first clock signal, and wherein M is an integer multiple of 45.

12. The method of claim 11, wherein the fourth clock signal is about P degrees out of phase with the third clock signal, and wherein P is an integer multiple of 90.

13. The method of claim 1, wherein the eighth clock signal is operable to adjust a duty cycle of the ninth clock signal.

14. A method, comprising:
    generating a first plurality of clock signals by combining a second plurality of clock signals according to a first set of logical operations, the second plurality of clocks signals out of phase with each other;
    generating a third plurality of clock signals by combining a fourth plurality of clock signals according to a second set of logical operations, the fourth plurality of clock signals out of phase with each other;
    selecting a first clock signal from the first plurality of clock signals based on a plurality of enable signals comprising a periodic sequence of changing enable codes, the periodic sequence of changing enable codes having a first value during a first cycle, a second value during a second cycle, and a third value during a third cycle;
    selecting a second clock signal from the second plurality of clock signals based on the plurality of enable signals; and
    generating a third clock signal based on the first and second clock signals, the third clock signal having a frequency based on the sequence of enable codes, the frequency different than a frequency of a reference clock used to generate the second plurality of clock signals and the fourth plurality of clock signals, the sequence of enable codes changing while the third clock signal is provided at the frequency, the frequency based on a length of the periodic sequence of enable codes.

15. The method of claim 14, wherein each of the fourth plurality of clock signals is out of phase with each of the second plurality of clock signals.

16. The method of claim 14, wherein the third clock signal has a duty cycle of about fifty percent, the duty cycle based only on superimposing the first clock signal and the second clock signal.

17. The method of claim 16, wherein the second clock signal is operable to adjust the duty cycle of the third clock signal.

18. The method of claim 14, wherein each of the first plurality of clock signals is at least 90 degrees out of phase with the other clock signals of the first plurality of clock signals.

19. The method of claim 14, wherein the second clock signal is operable to adjust a duty cycle of the third clock signal.

* * * * *